C. P. GRIMWOOD.
VACUUM PAN.
APPLICATION FILED MAR. 30, 1914.

1,126,757.

Patented Feb. 2, 1915.
2 SHEETS—SHEET 1.

Witnesses:
Hugo B. Olson.
A. S. Dunham.

Inventor
Chas. P. Grimwood
By his Attorneys
Kerr, Page, Cooper & Hayward

C. P. GRIMWOOD.
VACUUM PAN.
APPLICATION FILED MAR. 30, 1914.
1,126,757.
Patented Feb. 2, 1915.
2 SHEETS—SHEET 2.
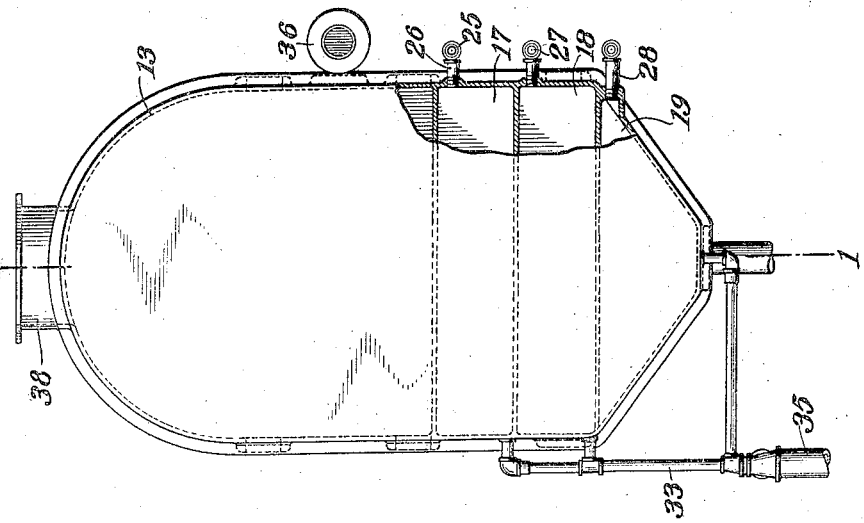
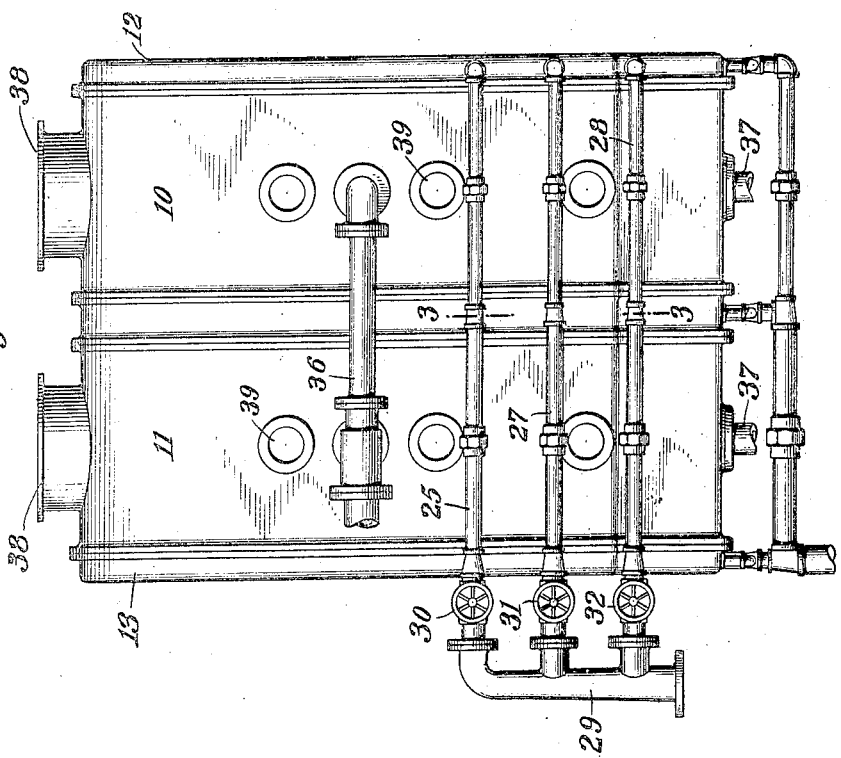

UNITED STATES PATENT OFFICE.

CHARLES P. GRIMWOOD, OF NEW YORK, N. Y.

VACUUM-PAN.

1,126,757.

Specification of Letters Patent.

Patented Feb. 2, 1915.

Application filed March 30, 1914. Serial No. 828,208.

*To all whom it may concern:*

Be it known that I, CHARLES P. GRIMWOOD, a citizen of the United States, residing at New York, in the county and State of New York, have invented certain new and useful Improvements in Vacuum-Pans, of which the following is a full, clear, and exact description.

This invention relates to vacuum pans, for evaporating or concentrating liquids under less than atmospheric pressure, and its chief object is to provide a pan, the capacity of which can be varied within wide limits by the addition or removal of sectional "units," which units may be the same or different in size.

Another object is to provide a vacuum pan which can easily be designed to have practically any desired liquid capacity in proportion to its heating surface.

A further object is to provide a vacuum pan in which the absolute amount of heating surface can be varied, so that there need never be any heating surface above the surface of the liquid.

A still further object is to provide a vacuum pan, the inner surfaces of which can be easily cleaned, a feature of particular advantage in evaporating such liquids as milk and other products that necessitate frequent cleaning of the apparatus.

To these and other ends the invention consists in the novel features of construction and combinations of elements hereinafter described.

One of the various forms in which the invention can be embodied is illustrated in the accompanying drawings.

Figure 1:
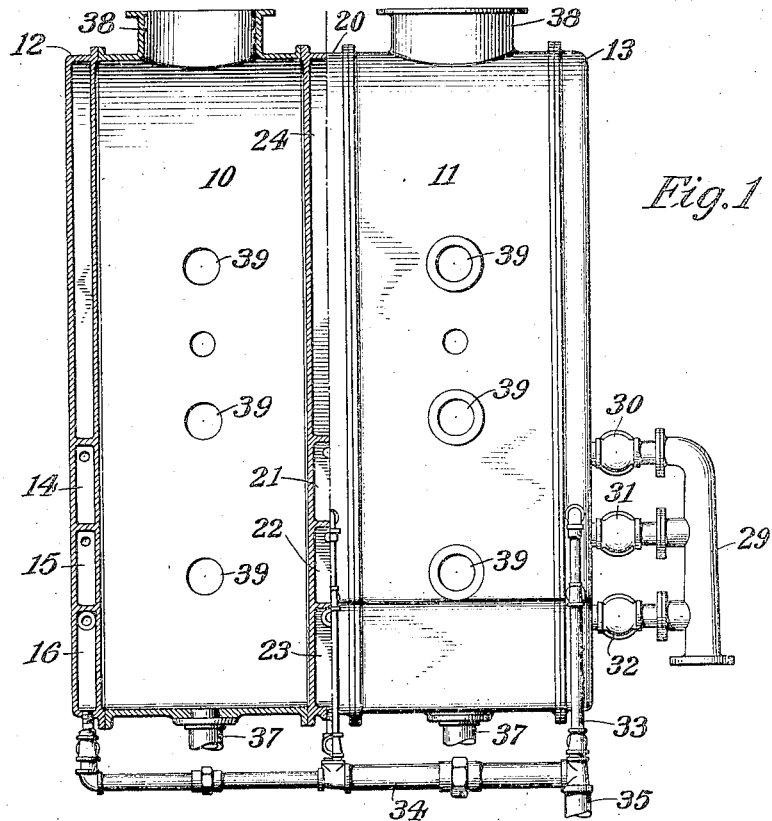
Figure 4:
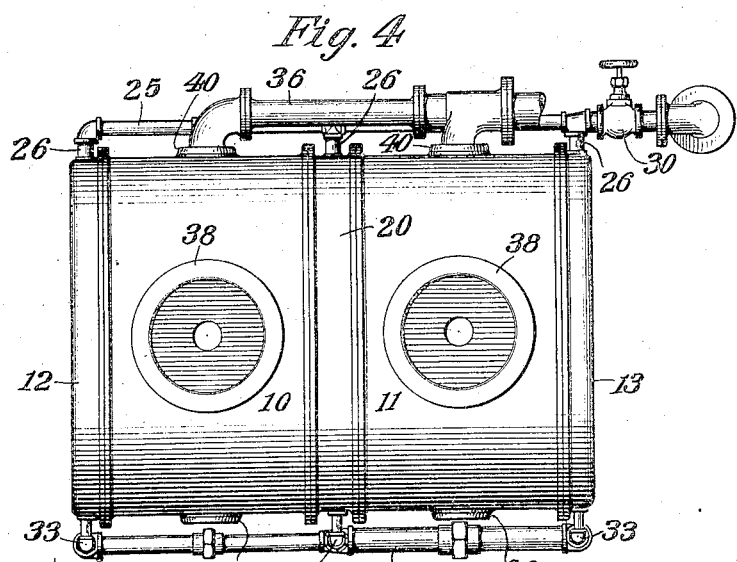

Referring thereto, Figure 1 is a front view, with one of the units or sections of the pan in vertical section on line 1—1 of Fig. 3. Fig. 2 is a rear view. Fig. 3 is an end view, looking from the left of Fig. 2 and partly in section on line 3—3 of Fig. 2. Fig. 4 is a plan view.

In the form illustrated, the pan comprises one or more open-sided shells or chambers, as 10, 11, of any convenient form but preferably with arch tops and sunk bottoms, as shown. As many of these shells as may be necessary to form a pan of the desired capacity are arranged side by side, but spaced apart. At the ends of the series, chambered end closures 12, 13, are provided, having internal chambers or passages, as 14, 15, 16, 17, 18, 19, for the steam or other heating medium. Preferably these passages are horizontal, as indicated in Figs. 1 and 3, and are located in the lower part of the closure. Between the successive shells an intermediate closure 20 is provided, similar to the aforesaid end closures and provided in its lower portion with chambers or passages 21, 22, 23, for the heating medium, the chambers or passages being preferably arranged horizontally and at the same height as the corresponding passages in the end closures. They may, however, be of greater capacity than the latter. Both the shells and the closures may be castings, detachably connected by means of flanged joints between them, as shown, and the closures are preferably formed with dead-air spaces, as 24, above the steam passages.

Across the rear of the pan, at about the top of the uppermost steam-passages, is a horizontal bus-pipe 25, connected to the said passages at the top thereof by short pipes 26, and across the lower passages are similar bus-pipes 27, 28, similarly connected to the respective passages. All the bus-pipes are connected at one end to a vertical manifold 29, which itself is suitably connected with a source (not shown) of steam or other heating medium. Valves 30, 31, 32 are provided in the bus-pipes, between the manifold and the adjacent steam-passages in the first end-closure, to regulate the steam supply to the heating passages. Thus the valve 30 controls the supply to the horizontal set of chambers or passages composed of the passages 14, 21, 17. For the purpose of equalizing the supply among the several passages the bus-pipes are reduced in diameter in the direction of flow of the steam, as is also the manifold 29. The condensed or exhaust steam leaves the heating passages at the bottom of each by way of vertical bus-pipes 33 arranged at the front of the pan and connected at their lower ends to a horizontal manifold 34. The latter is connected to a waste pipe 35, discharging at any convenient point, not shown. The bus-pipes 33 and manifold 34, if not of uniform capacity throughout, increase in diameter in the direction of flow of the exhaust.

The liquid to be evaporated is delivered to the pan-sections, intermittently or continuously, by a horizontal manifold 36, and the bottom of the sections are provided with discharge or outlet pipes 37 which may, if desired, be connected with a manifold (not shown). At the top the pan-sections are provided with suitable necks 38 for connection with the usual condenser, not shown. Peep-holes 39 in the front and rear of each section, with removable glass closures 40, Fig. 4, permit inspection of the interior during operation.

From the foregoing it will be seen that the total capacity of the vacuum pan depends, with any given size of section, upon the number of sections or units employed, and that the capacity can be varied by adding or removing sections. The ratio of the capacity of the pan to the heating surface thereof depends chiefly upon the width of the sections (the other dimensions thereof remaining constant) so that this ratio can be given any desired value by suitable design of the apparatus, merely by increasing or diminishing the width of the sections. The ratio can also be varied in any given design by control of the supply of heating medium to the heating passages, by means of the valves 30, 31, 32. Thus, the heating passages being connected "in multiple," so to speak, closing the valve 32 will cut off the supply to all the lower passages and hence reduce the total heating surface by that amount.

In cases where the liquid level is maintained above the top of the uppermost steam passage, all the passages may be kept in operation, but in some instances the level falls. In such cases, when the level sinks below the top of a set of heating passages the set can, if desired, be cut out of the system, thereby keeping the heating surface always below the surface of the liquid. The interior of the sections being free from heating coils or similar complications, the surfaces with which the liquid comes in contact can easily be kept clean.

It is clear that the closure-passages of the apparatus can be used to cool its contents, as for example, by supplying a suitable cooling medium to the passages in the closures.

It is to be understood that the invention is not limited to the construction herein specifically illustrated and described, but can be embodied in other forms without departure from its proper spirit and scope.

I claim:

1. A vacuum pan comprising one or more open-sided sections, closures having passages for a heating medium and arranged to close the sides of the section or sections, and means for supplying a heating medium to said passages.

2. A vacuum pan comprising one or more open-sided sections, chambered closures closing the sides of the section or sections, piping connecting the chambers of the closures in multiple for supplying a heating medium thereto, and means for carrying off exhaust heating medium from said chambers.

3. A vacuum pan comprising a plurality of open-sided sections arranged side by side, intermediate and end-closures closing the sides of the sections and provided with passages for a heating medium, means for supplying a heating medium to said passages, and means for carrying off the exhaust heating medium.

4. A vacuum pan comprising a plurality of open-sided sections arranged side by side, intermediate and end-closures closing the sides of the sections and provided with horizontal passages extending from front to rear, means for supplying a heating medium to said passages, and means for carrying off exhaust heating medium.

5. A vacuum pan comprising an open-sided shell, closures for the sides of the shell, each having a plurality of horizontal passages, one above the other, valved supply pipes connecting the passages in horizontal sets for delivering a heating medium thereto, and means for carrying off exhaust heating medium.

6. A vacuum pan comprising a plurality of open-sided sections arranged side by side, intermediate and end-closures closing the sides of the sections, each closure having horizontal heating passages, one above the other, valved bus-pipes connecting, in multiple, passages located at the same height above the bottom of the pan, means for supplying a heating medium to the bus-pipes, and means for carrying off exhaust heating medium.

7. A vacuum pan comprising a plurality of open-sided sections arranged side by side, intermediate and end closures closing the sides of the sections and each provided with horizontal heating passages extending from front to rear, one above the other, valved bus-pipes extending across the passages at one end and connecting the same in multiple, a manifold connected to the bus-pipes to supply a heating medium thereto, and exhaust pipes connected to the heating passages at the ends opposite the bus-pipes.

8. A vacuum pan comprising a plurality of open-sided sections arranged side by side and each having a depressed bottom provided with an outlet at its lowest point, intermediate and end-closures closing the sides of the sections and each provided with a plurality of horizontal heating passages extending from front to rear, one above the other, valved horizontal bus-pipes extending across the passages at one end and connected thereto, a vertical manifold connected to the bus-pipes for supplying a heating medium thereto, means for carrying off exhaust heating medium from the passages, means for supplying liquid to be evaporated to the aforesaid sections, and means for connecting the sections to a condenser.

In testimony whereof I affix my signature in the presence of two subscribing witnesses.

CHARLES P. GRIMWOOD.

Witnesses:
M. LAWSON DYER,
S. S. DUNHAM.

Copies of this patent may be obtained for five cents each, by addressing the "Commissioner of Patents, Washington, D. C."